US012598017B2

(12) United States Patent
Li et al.

(10) Patent No.:     US 12,598,017 B2
(45) Date of Patent:          Apr. 7, 2026

(54) DYNAMIC PACKET DELAY BUDGET PROCESSING IN QUALITY OF SERVICE

(71) Applicant: ZTE Corporation, Shenzhen (CN)

(72) Inventors: Zhendong Li, Shenzhen (CN); Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 292 days.

(21) Appl. No.: 18/365,606

(22) Filed: Aug. 4, 2023

(65) Prior Publication Data

US 2023/0388036 A1     Nov. 30, 2023

Related U.S. Application Data

(63) Continuation of application No. PCT/CN2021/075372, filed on Feb. 5, 2021.

(51) Int. Cl.
*H04J 3/06*          (2006.01)
*H04W 56/00*          (2009.01)

(52) U.S. Cl.
CPC ......... *H04J 3/0667* (2013.01); *H04W 56/004* (2013.01)

(58) Field of Classification Search
None
See application file for complete search history.

(56) References Cited

U.S. PATENT DOCUMENTS

| 2020/0267088 A1* | 8/2020 | Navrátil | H04L 43/16 |
| 2022/0303824 A1* | 9/2022 | Li | H04L 47/24 |
| 2022/0394647 A1* | 12/2022 | Moon | H04J 3/0667 |

FOREIGN PATENT DOCUMENTS

| CN | 103857052 A | 6/2014 |
| CN | 110519795 A | 11/2019 |
| CN | 111148165 A | 5/2020 |
| WO | WO 2020/252642 A1 | 12/2020 |
| WO | WO 2021/004630 A1 | 1/2021 |

OTHER PUBLICATIONS

Extended European Search Report received for European Patent Application No. 21923751.8 mailed Sep. 9, 2024, 11 pages.
Qualcomm Incorporated, "New solutions Key Issue #6: Division of E2E PDB" SA WG2 Meeting #130, S2 1900488, Jan. 21, 2019, 2 pages.
International Search Report and Written Opinion received for Application No. PCT/CN2021/075372 mailed Nov. 3, 2021 (7 pages).

* cited by examiner

*Primary Examiner* — Anh Ngoc M Nguyen
(74) *Attorney, Agent, or Firm* — Crowell & Moring LLP

(57)          ABSTRACT

A packet delay budget ("PDB") improves quality of service ("QoS") by providing an accurate delay of packets over a network. PDB includes an access network PDB ("AN PDB") and a core network PDB ("CN PDB"). Because the PDB can change based on network load, the PDB value is more accurate when the CN PDB is dynamically determined. The dynamic CN PDB can be calculated at the basestation or at the user plane function ("UPF") and an indication of the dynamic PDB indication can be sent between the basestation and/or the UPF.

14 Claims, 14 Drawing Sheets

Figure 5

DYNAMIC PACKET DELAY BUDGET PROCESSING IN QUALITY OF SERVICE

PRIORITY

This application claims priority as a Continuation to PCT/CN2021/075372 filed Feb. 5, 2021, entitled "DYNAMIC PACKET DELAY BUDGET PROCESSING IN QUALITY OF SERVICE", published as WO 2022/165730 A1, the entire disclosure of which is herein incorporated by reference.

TECHNICAL FIELD

This document is directed generally to wireless communications. More specifically, a packet delay budget is dynamically processed for improving quality of service.

BACKGROUND

Wireless communication technologies are moving the world toward an increasingly connected and networked society. Wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. User mobile stations or user equipment (UE) are becoming more complex and the amount of data communicated continually increases. In order to improve communications and meet reliability requirements for the vertical industry as well as support the new generation network service, improvements should be made to maintain and ensure the quality of service standards.

SUMMARY

This document relates to methods, systems, and devices for calculating and communicating a dynamic packet delay budget ("PDB"). A PDB improves quality of service ("QoS") by providing an accurate delay of packets over a network. PDB includes an access network PDB ("AN PDB") and a core network PDB ("CN PDB"). Because the PDB can change based on network load, the PDB value is more accurate when the CN PDB is dynamically determined. The dynamic CN PDB can be calculated at the basestation or at the user plane function ("UPF") and an indication of the dynamic PDB indication can be sent between the basestation and/or the UPF. As described herein, a basestation may also be referred to as a Next Generation Radio Access Network ("NG-RAN"), NG-RAN node, RAN node, or a base station.

In one embodiment, a method for wireless communication includes receiving a packet with a first timestamp, and calculating, dynamically, a Core Network Packet Delay Budget ("CN PDB") based on the first timestamp. The first timestamp is received by a basestation from a User Plane Function ("UPF") and the first timestamp is a local timestamp at the UPF. The first timestamp is from the UPF and the calculation of the CN PDB is performed by the basestation and further includes measuring a local time as a second timestamp upon receiving of the packet from the UPF, and subtracting the second timestamp and the first timestamp to calculate the CN PDB, when the UPF and basestation are time synchronized. When the UPF and basestation are not time synchronized, the first timestamp is from the UPF and the calculation of the CN PDB is performed by the basestation and further includes checking a second timestamp before receiving of the packet, adding, before receiving the packet with the first timestamp, the second timestamp to an uplink packet, wherein the packet with the first timestamp is sent by the UPF after the uplink packet with the second timestamp is received at the UPF, measuring as a third timestamp, the time the packet is received, and calculating the CN PDB based on the first timestamp, the second timestamp and the third timestamp, wherein the first timestamp includes both a time the uplink packet is received and a time the packet is sent by the UPF, the second timestamp is a time the uplink packet is sent, and the third timestamp is a local time upon the receiving of the packet with the first timestamp. The dynamic calculating of the CN PDB includes ((the third timestamp minus the second timestamp) minus (a difference between the times from the first timestamp)) divided by two. The method further includes deriving an Access Network Packet Delay Budget ("AN PDB") by using a total PDB and the dynamically calculated CN PDB, wherein the CN PDB is a delay between a User Plane Function ("UPF") and a basestation and the AN PDB is a delay between the basestation and a user equipment.

In another embodiment, a method for wireless communication includes receiving an uplink packet with a first timestamp, calculating, dynamically, a Core Network Packet Delay Budget ("CN PDB") based on the first timestamp, and communicating the dynamically calculated CN PDB. The uplink packet is received from a basestation and the first timestamp is a local timestamp at the basestation, wherein the calculating is by a User Plane Function ("UPF"). The communicating is the UPF providing the dynamically calculated CN PDB to the basestation. When the UPF and the basestation are time synchronized, the first timestamp is from the basestation and the calculation of the CN PDB is performed by the UPF and further includes checking a local time at the UPF as a second timestamp upon receiving of the uplink packet, and subtracting the first timestamp from the second timestamp to calculate the CN PDB. When the UPF and the basestation are not time synchronized, the first timestamp is from the basestation and the calculation of the CN PDB further includes checking a second timestamp before receiving of the uplink packet, adding, before receiving the uplink packet with the first timestamp, the second timestamp to a downlink packet, measuring a local time as a third timestamp upon receiving of the uplink packet, wherein the uplink packet includes the first timestamp and the second timestamp, wherein the first timestamp includes a time that the downlink packet is received and includes a time that the uplink packet is sent, and calculating the CN PDB based on the first timestamp, the second timestamp, and the third timestamp. The dynamic calculating of the CN PDB includes ((the third timestamp minus the second timestamp) minus (a difference between the times included in the first timestamp)) divided by two. The communicating includes communicating information of the dynamically calculated CN PDB to a Session Management Function ("SMF") and the SMF communicates the information to the basestation. The communicating includes an information of the dynamically calculated CN PDB provided to NG-RAN in a user data packet. The communicating of the dynamically calculated CN PDB is used for by the basestation for calculating an Access Network Packet Delay Budget ("AN PDB") that is used for determining scheduling of packets. The CN PDB is a delay between a User Plane Function ("UPF") and a basestation, wherein the AN PDB is a delay between the basestation and a user equipment.

In another embodiment, a method for wireless communication includes sending, by a Session Management Function ("SMF"), a dynamically calculated Core Network Packet Delay Budget ("CN PDB") indication. The SMF sends the dynamically calculated CN PDB indication to a User Plane Function ("UPF") or to a basestation.

In another embodiment, a method for wireless communication includes receiving, an indication for a Core Network Packet Delay Budget ("CN PDB"), and dynamically calculating the CN PDB. A User Plane Function ("UPF") or a basestation receives the indication.

In another embodiment, a wireless communications apparatus comprising a processor and a memory, wherein the processor is configured to read code from the memory and implement any of the methods for wireless communication described herein.

In another embodiment, a computer program product comprising a computer-readable program medium code stored thereupon, the code, when executed by a processor, causing the processor to implement any of the methods for wireless communication described herein.

In another embodiment, a system for wireless communication includes a User Plane Function ("UPF") determining a first timestamp, a basestation communicating with the UPF that dynamically calculates a Core Network Packet Delay Budget ("CN PDB") based on the first timestamp and a local timestamp at the basestation, and a Session Management Function ("SMF") in communication with the UPF that provides an indication of the dynamic CN PDB to the basestation or the UPF. The system includes a user equipment in communication with the basestation, wherein an Access Network Packet Delay Budget ("AN PDB") is calculated for delay between the user equipment and the basestation.

In another embodiment, a system for wireless communication includes a basestation determining a first timestamp, and a User Plane Function ("UPF") that dynamically calculates a Core Network Packet Delay Budget ("CN PDB") based on the first timestamp and a local timestamp at the UPF and communicates the calculated CN PDB to the basestation. The system further includes a Session Management Function ("SMF") in communication with the UPF that provides an indication of the dynamic CN PDB to the basestation or the UPF.

BRIEF DESCRIPTION OF THE DRAWINGS

FIG. 5 shows one embodiment of quality of service flow in a system architecture, such as that shown in FIG. 3 or FIG. 4.

DETAILED DESCRIPTION

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 3:
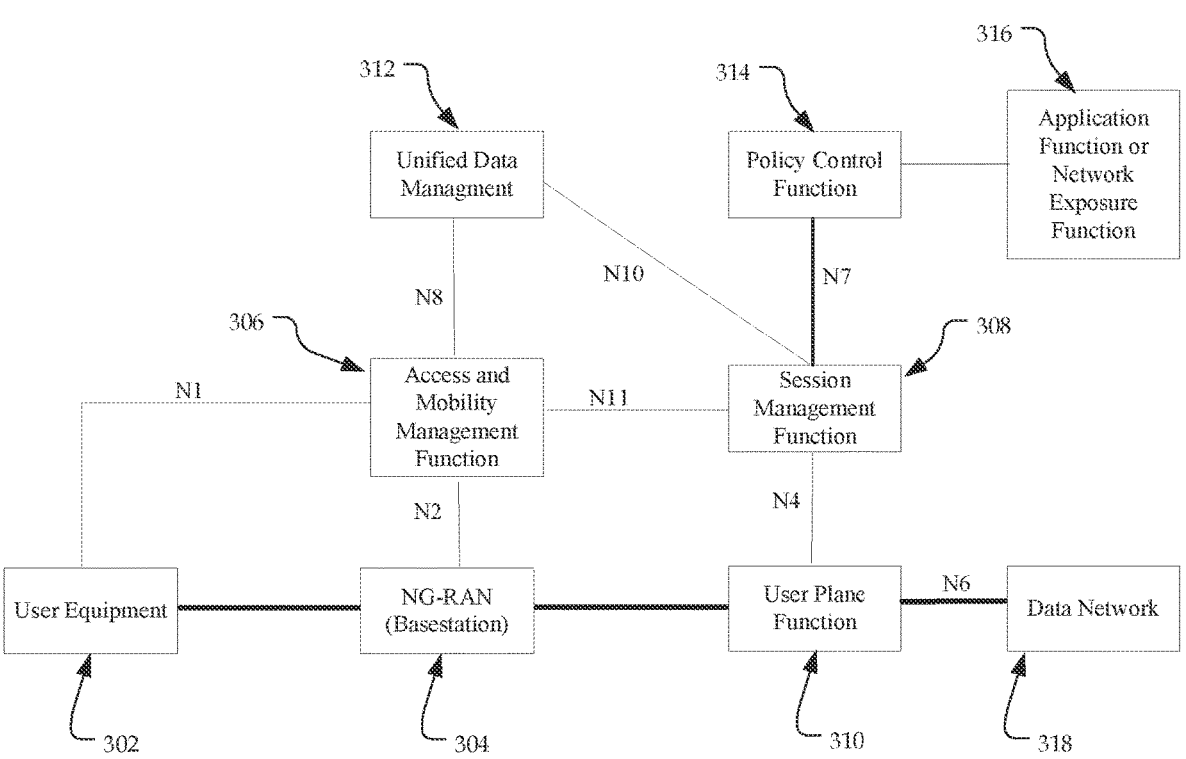
FIG. 3 shows one embodiment of a wireless network system architecture.
Figure 4:
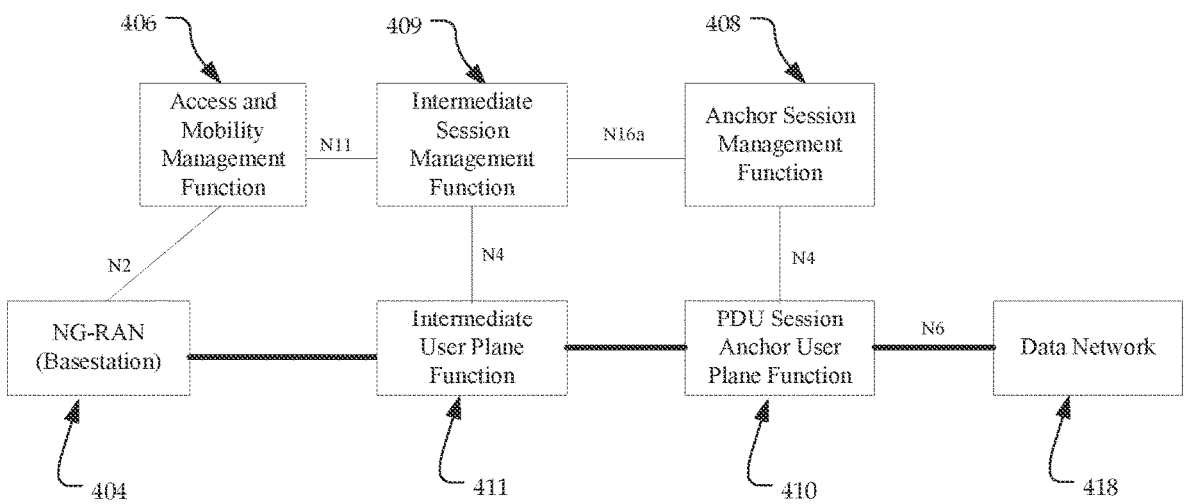
FIG. 4 shows another embodiment of a wireless network system architecture.
Figure 5:
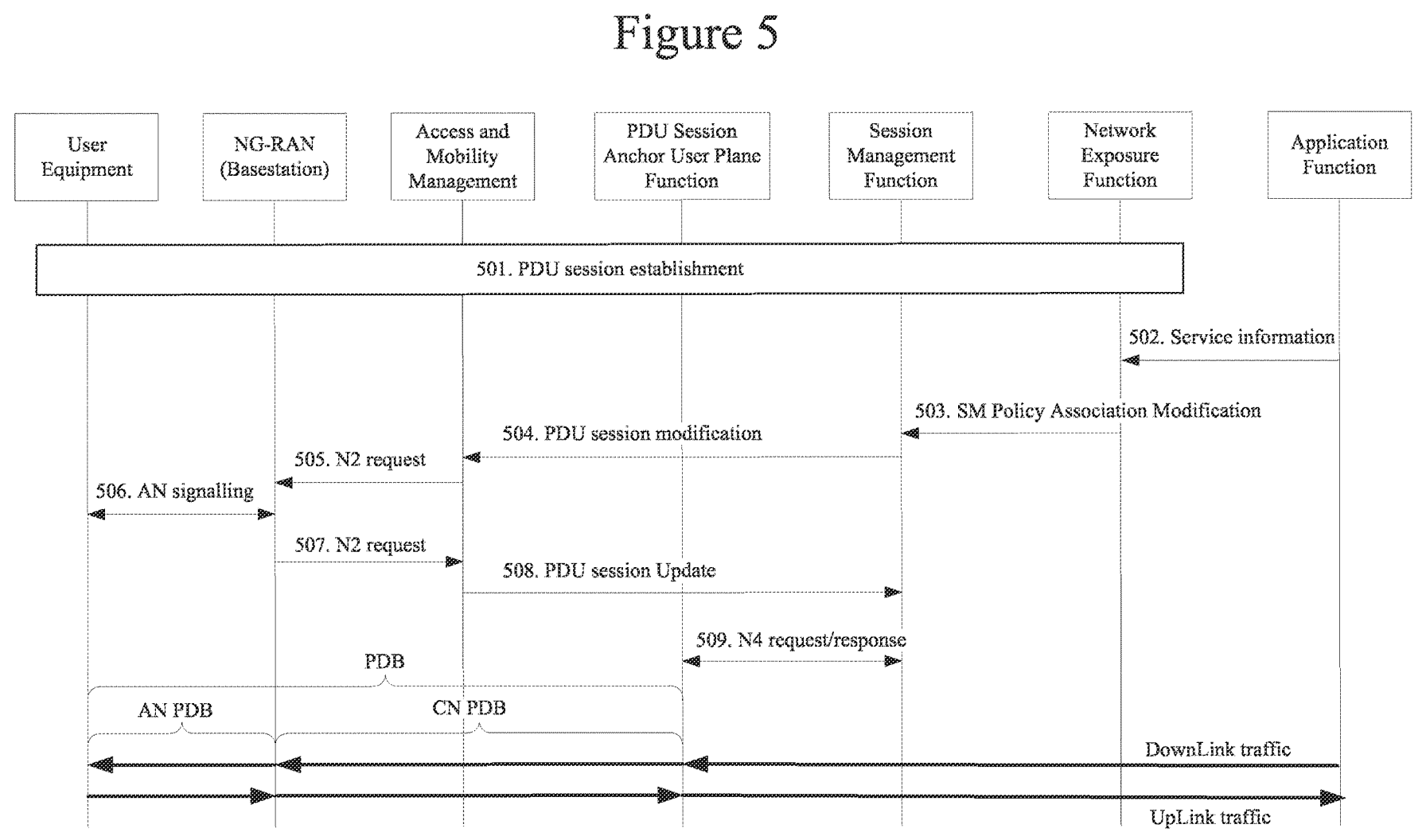

New Radio Access ("NR") includes the parameter packet delay budget ("PDB") to improve the quality of service ("QoS") requirements for reliability. For one Qos flow, the PDB is a certain value obtained from the Session Management Function ("SMF"). The PDB may include an Active Network PDB ("AN PDB") and a Core Network PDB ("CN PDB") and may be referred to as total PDB. The CN PDB may be dynamically calculated by the User Plane Function ("UPF") or the Next Generation Radio Access Network ("NG-RAN")/basestation. The dynamically calculated CN PDB can then be used to derive the AN PDB, which can then be used for scheduling of resources for more efficient network control. Communication of an indication of the dynamic CN PDB can be to/from the UPF and NG-RAN. The RAN may be a part of a wireless communication system that connects UE devices to other parts of a network through radio or wireless connections. FIGS. 3-4 illustrate an exemplary system architecture for the CN PDB dynamic calculation and communication. Specifically, the Core Network PDB ("CN PDB") illustrated in FIG. 5 is dynamically calculated and communicated for improved QoS.

In a NR system, including 5th generation networks ("5G"), the QoS may be a necessary feature for reliability. There may be a number of QoS characteristics that are part of a QoS flow in a packet data unit ("PDU") session. Example parameters for QoS include Guaranteed Flow Bit Rate ("GFBR"), Packet Error Rate ("PER"), and Packet Delay Budget ("PDB"). GFBR includes a bit rate that is guaranteed to be provided by the network to the QoS flow over an averaging time window. PER defines an upper bound for the rate of PDUs (e.g. IP packets) that have been processed by a sender of a link layer protocol (e.g. RLC in RAN) but that are not delivered by the corresponding receiver to the upper layer (e.g. PDCP in RAN). PDB defines an upper bound for the time that a packet may be delayed between the user equipment ("UE") and the UPF.

The PDB may be an upper bound on time that a packet of Qos flow traverses the network. The real packet delay in the network should be less than the PDB when the network load is light, and real packet delay may be larger than the PDB when the network load is heavy. The real deday in the network may be estimated, but can change based on network conditions. For example, the network may not know the exact packet delay when the packet travels the network, so the network may not be able to precisely control the real delay of QoS flow in the network.

The PDB may include an Active Network PDB ("AN PDB") and a Core Network PDB ("CN PDB"). The overall or total PDB is a combination of AN PDB and CN PDB, such that PDB=AN PDB+CN PDB. The CN PDB represents a delay between a User Plane Function ("UPF") and the NG-RAN or basestation. The AN PDB represents the delay between user equipment ("UE") and the NG-RAN or basestation. When the NG-RAN knows the available AN PDB, it can properly schedule resources. For example, if the PDB of downlink Qos flow is 10 milliseconds, and the NG-RAN knows that CN PDB of downlink Qos flow is 8 ms, it can immediately schedule the radio resource for packet delivery, because there is only 2 milliseconds left for the AN PDB Likewise, if the NG-RAN knows that CN PDB is 5 milliseconds, then 5 milliseconds is left for the AN PDB, so the NG-RAN can determine when to schedule the radio resource for packet delivery. Accurate dynamic calculation of CN PDB and then the subsequent determination of AN PDB, can ensure QoS by NG-RAN and more effectively schedule RAN resources.

Figure 1:
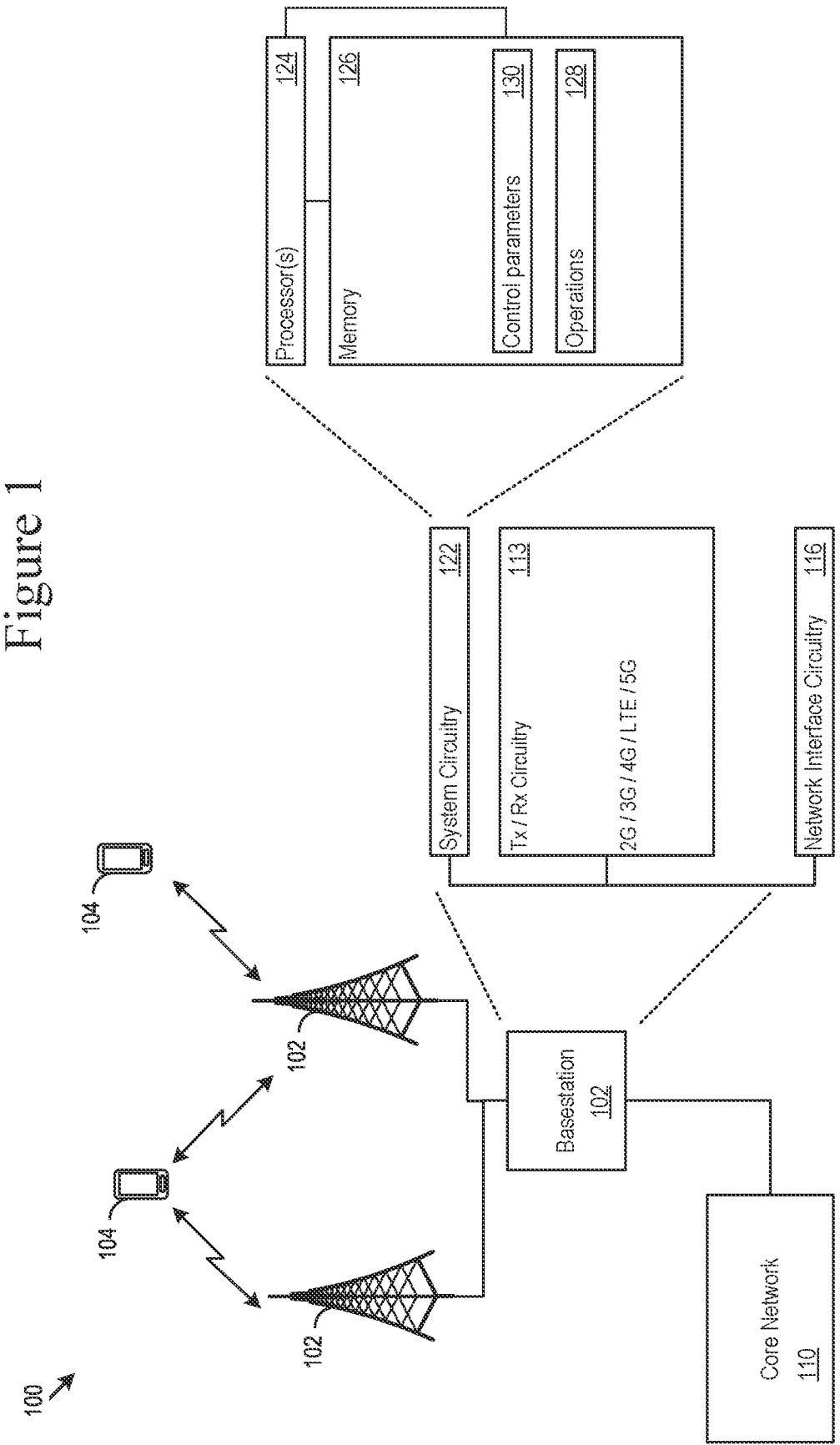
FIG. 1 shows an example basestation.
Figure 2:
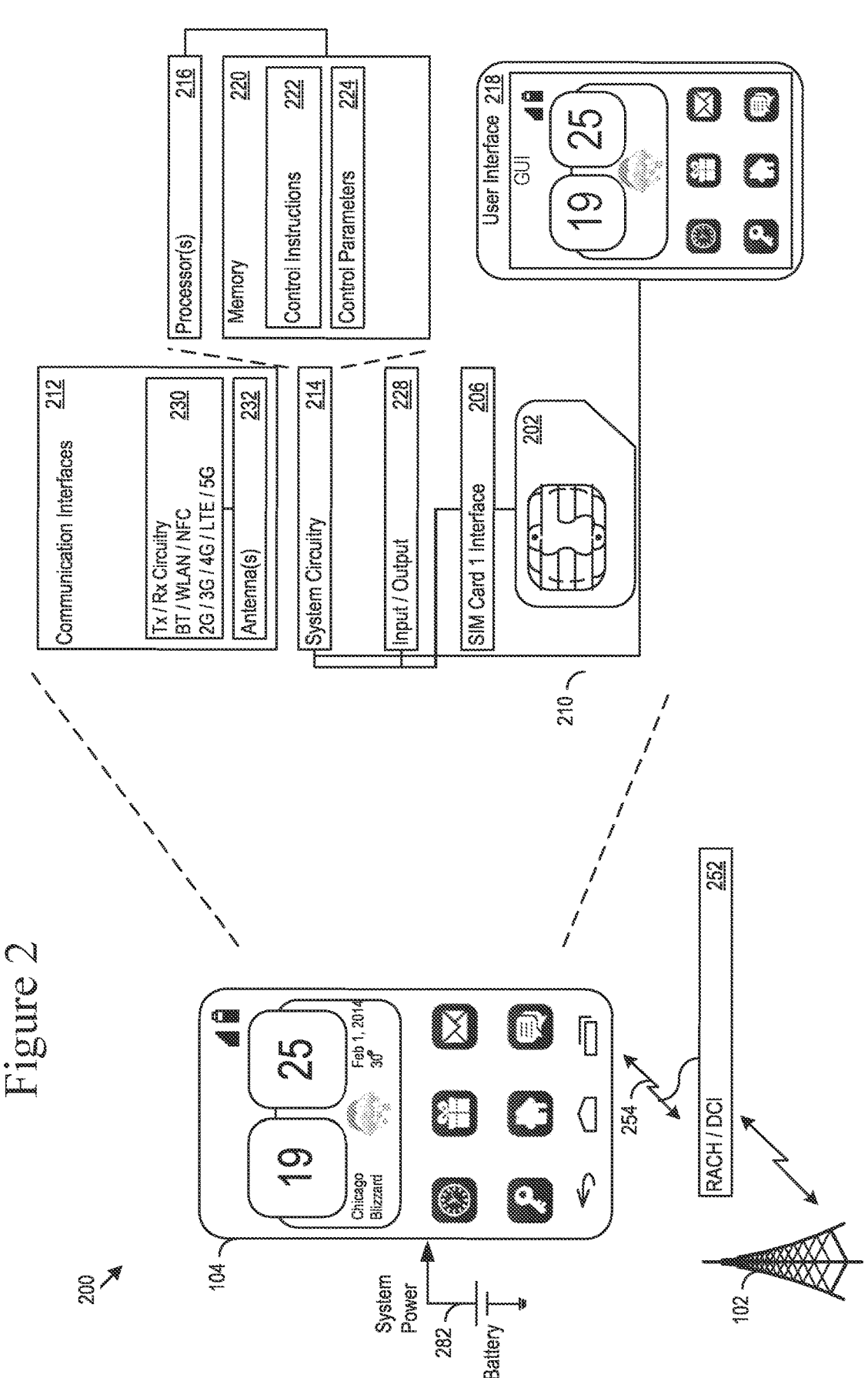
FIG. 2 shows an example random access (RA) messaging environment.

Since the real delay can be dynamically changed according to network load, QoS can be improved if the CN PDB are dynamically calculated. This dynamic calculation provides the actual delay between the UPF and NG-RAN. FIG. 1 illustrates an example NG-RAN or basestation. FIG. 2 illustrates an example random access messaging environment. FIGS. 3-4 illustrate an example architecture for the dynamic PDB calculation. FIG. 5 illustrates an example flow that shows both AN PDB and CN PDB.

FIG. 1 shows an example basestation 102. The basestation 102 may also be referred to as a wireless network node or a next generation radio access network ("NG-RAN") node. The basestation 102 may be further identified to as a nodeB (NB, e.g., an eNB or gNB) in a mobile telecommunications context. The example basestation may include radio Tx/Rx circuitry 113 to receive and transmit with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

FIG. 2 shows an example random access messaging environment 200. In the random access messaging environment a UE 104 may communicate with a basestation 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

FIG. 3 shows one embodiment of a wireless network system architecture. This architecture is merely one example and there may be more or fewer components for implementing the embodiments described herein. The interconnections or communications between components are identified as N1, N2, N4, N6, N7, N8, N10, and N11, which may be referred to by other Figures, including FIG. 5. FIG. 2 illustrated an example user equipment ("UE") 104. UE 302 is a device accessing a wireless network (e.g. 5GS) and obtaining service via a NG-RAN node or basestation 304. The UE 302 interacts with an Access and Mobility Control Function ("AMF") 306 of the core network via NAS signaling. FIG. 1 illustrates an example basestation or NG-RAN 102. The NG-RAN node 304 is responsible for the air interface resource scheduling and air interface connection management of the network to which the UE accesses. The AMF 306 includes the following functionalities: Registration management, Connection management, Reachability management and Mobility Management. The AMF 306 also perform the access authentication and access authorization. The AMF 306 is the NAS security termination and relay the session management NAS between the UE 302 and the SMF 308, etc.

The SMF 308 includes the following functionalities: Session Management e.g. Session establishment, modify and release, UE IP address allocation & management (including optional Authorization), Selection and control of uplink function, downlink data notification, etc. The user plane function ("UPF") 310 includes the following functionalities: Anchor point for Intra-/Inter-RAT mobility, Packet routing & forwarding, Traffic usage reporting, QoS handling for user plane, downlink packet buffering and downlink data notification triggering, etc. The Unified Data Management ("UDM") 312 manages the subscription profile for the UEs. The subscription includes the data used for mobility management (e.g. restricted area), session management (e.g. QoS profile). The subscription data also includes slice selection parameters, which are used for AMF 306 to select a proper SMF 308. The AMF 306 and SMF 308 get the subscription from the UDM 312. The subscription data may be stored in a Unified Data Repository with the UDM 312, which uses such data upon reception of request from AMF 306 or SMF 308. The Policy Control Function ("PCF") 314 includes the following functionality: supporting unified policy framework to govern network behavior, providing policy rules to control plane function(s) to enforce the policy rule, and implementing a front end to access subscription information relevant for policy decisions in the User Data Repository. The Network Exposure Function ("NEF") 316 is deployed optionally for exchanging information with an external third party. In one embodiment, an Application Function ("AF") 316 may store the application information in the Unified Data Repository via NEF. The UPF 310 communicates with the data network 318.

FIG. 4 shows another embodiment of a wireless network system architecture. FIG. 4 includes an Intermediate SMF ("I-SMF") 409 and an Intermediate UPF ("I-UPF") 411. These intermediate components are in addition to the SMF 308, which is illustrated as the Anchor SMF ("A-SMF") 408, and the UPF 310, which is illustrates as the PDU Session Anchor UPF 410. FIG. 4 also illustrates the NG-RAN 404, the AMF 406, and the data network 418, which may be similar to the corresponding components in FIG. 3. The I-SMF 409 is inserted between the AMF 406 and the A-SMF 408. The I-UPF 411 is inserted between the NG-RAN 404 and the PDU Session Anchor UPF 410. In other embodiments, there may additional intermediate components (additional I-SMFs or additional I-UPFs).

FIG. 5 shows one embodiment of quality of service flow in a system architecture, such as that shown in FIG. 3 or FIG. 4. FIG. 5 illustrates components from FIG. 3 and the flow of communication between those components in one embodiment. In block 501, the UE establishes the PDU session in the network system. In block 502, the AF provides/revokes service management information (e.g. by invoking Npcf_PolicyAuthorization Create Request or Npcf_PolicyAuthorization Update Request) for service operation with the NEF. In block 503, the NEF initiates a Session Management Policy Association modification to SMF, which may include a Policy and Charging Control ("PCC") rule. In block 504, the SMF applies the received PCC rule to an existing Qos flow or for establishing new Qos flow. The SMF initiates the PDU session modification towards UE via AMF and NG-RAN. The SMF may invoke a message transfer (e.g. Namf_Communication_N1N2) to AMF which include the session management ("SM") information. The SM information may include the PDB and CN PDB which is statically pre-configured in the SMF. In block 505, the AMF sends NG-RAN a message, which includes the SM container. In block 506, the NG-RAN issues RAN specific signaling to exchange with the UE the information received from the SMF and to reserve the radio resource for the Qos flow. In block 507, the NG-RAN acknowledge the PDU Session Request by sending a PDU Session Acknowledgment. In block 508, the AMF initiates a service operation (e.g. Nsmf_PDUSession_UpdateSMContext) to forward the SM information received from NG-RAN to SMF. In block 509, the SMF sends a request to the UPF to install the PCC rule.

In block 504, the NG-RAN may know the PDB of QoS flow. The CN PDB may be statically pre-configured in the NG-RAN or received from SMF. The AN PDB can be calculated based on the PDB and the CN PDB. Since the packet delay between UPF and basestation can be dynamically changed according to network load, the statically pre-configured CN PDB is not accurate. FIG. 5 illustrates that the PDB includes the CN PDB between UPF and NG-RAN and the AN PDB between the NG-RAN and the UE. The CN PDB may be statically pre-configured per pair (NG-RAN node, PSA UPF node). If there is an intermediate UPF (see FIG. 4) between PSA UPF and NG-RAN, the statically pre-configured CN PDB per pair (NG-RAN node, PSA UPF node) may not work. There may be an I-UPF in FIG. 4 between PSA UPF and NG-RAN when the NG-RAN and UPF cannot connect to each other directly, so there is no configurable PDB between the NG-RAN and the PSA UPF.

Figure 6:
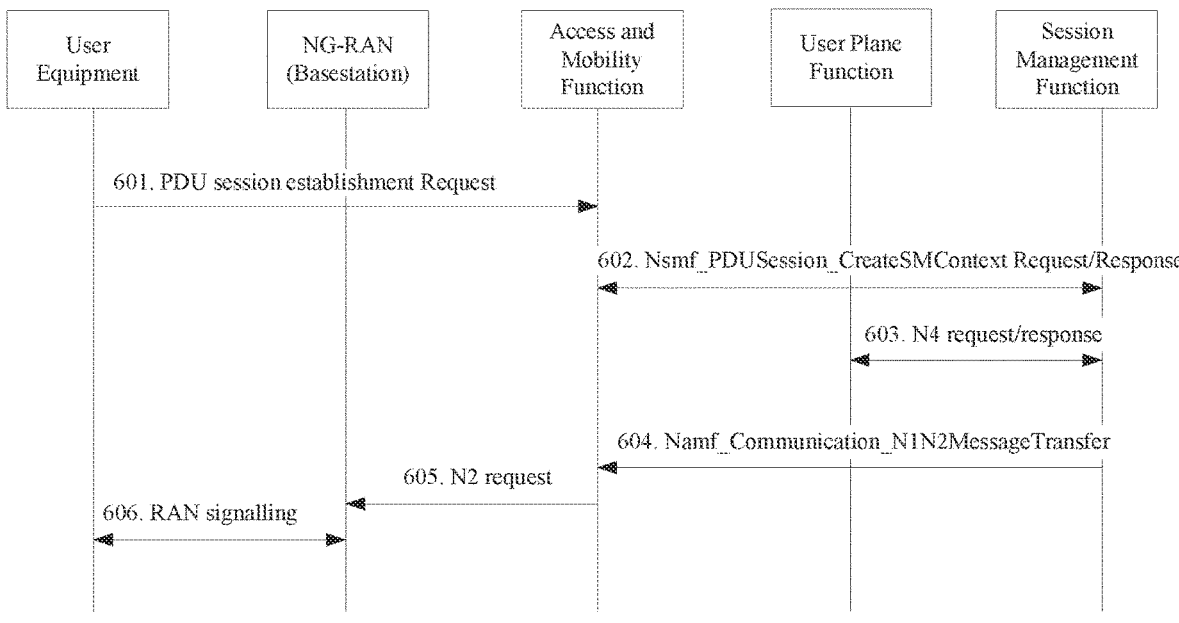
FIG. 6 shows one embodiment of a dynamic indication being sent.

FIG. 6 shows one embodiment of a dynamic indication being sent. Specifically, FIG. 6 shows the SMF sending a dynamically calculated CN PDB indication. The SMF indicates to UPF and NG-RAN, that the dynamic CN PDB is enabled. This may reuse the PDU session establishment procedure in one embodiment. In block 601, the UE sends the PDU session establishment Request to the AMF. In block 602, the AMF selects SMF, and invokes a service operation (e.g. Nsmf_PDUSession_CreateSMContext) with SMF to create the PDU session context in the SMF. In block 603, the SMF sends a request to the UPF to install the PCC rule. This request may include the dynamic CN PDB indication. In block 604, the SMF sends a request to AMF which include the N2 SM information, and the N1 SM container. The request may be a Namf_Communication_N1N2 Message transfer service operation in one embodiment. The N2 SM information may include the dynamic CN PDB indication. In block 605, the AMF sends NG-RAN N2 message, which includes the N2 SM information and the N1 SM container. In block 606, the NG-RAN issues RAN specific signaling to exchange with the UE the information received from SMF.

Figure 7:
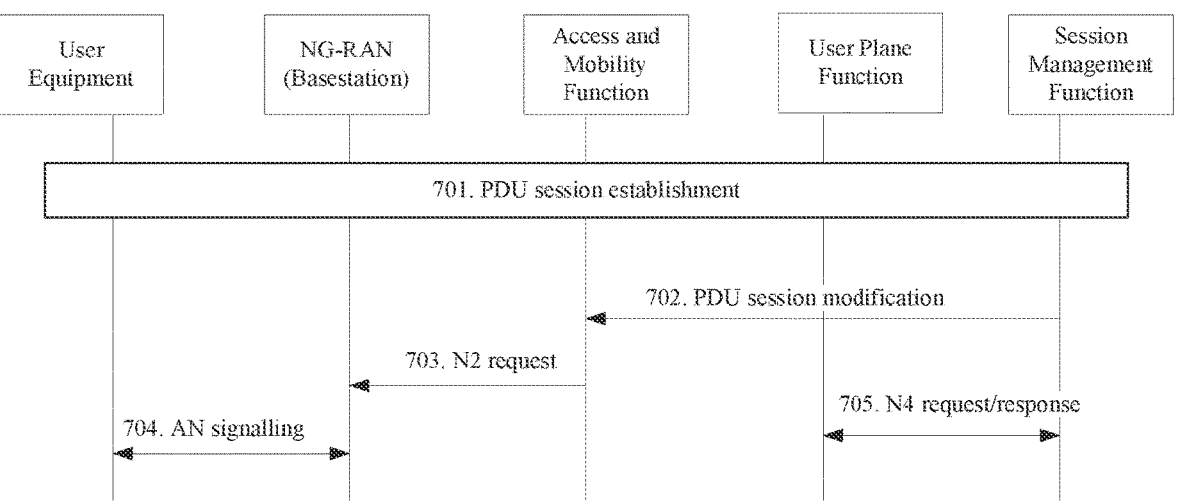
FIG. 7 shows another embodiment of a dynamic indication being sent.

FIG. 7 shows another embodiment of a dynamic indication being sent. The SMF indicates to UPF and NG-RAN that the dynamic CN PDB is enabled. It may reuses the PDU session modification procedure in one embodiment. In block 701, the UE has established the PDU session in the network system. In block 702, The SMF initiates the PDU session modification towards UE via AMF and NG-RAN. The SMF may invoke a message transfer (e.g. Namf_Communication_N1N2) to AMF which includes the N2 SM information and the N1 SM container. The N2 SM information includes the dynamic CN PDB indication. In block 703, the AMF sends NG-RAN an N2 message which includes the N2 SM information and the N1 SM container. In block 704, the NG-RAN issues RAN specific signaling to exchange with the UE the information received from SMF and reserve the radio resource for the QoS flow. In block 705, the SMF sends an N4 request to UPF to install the PCC rule. The N4 request includes a dynamic CN PDB indication.

Figure 8:
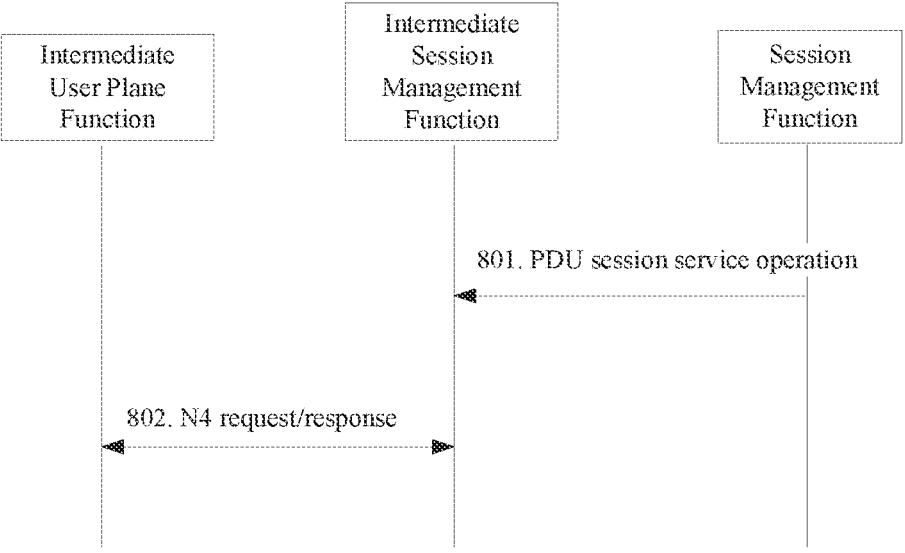
FIG. 8 shows an embodiment of a dynamic indication being sent with an intermediate component.

FIG. 8 shows an embodiment of a dynamic indication being sent with an intermediate component. Specifically, FIG. 4 illustrated an architecture with an I-UPF and I-SMF. FIG. 8 illustrates communication of a dynamic CN PDB indication with an I-UPF. The dynamic CN PDB indication is sent to I-UPF rather than the UPF as in FIGS. 6-7. In block 801, the SMF invokes the PDU session service operation to the I-SMF. It may include a Nsmf_PDUSession_Create Response, or Nsmf_PDUSession_Update Request/Response service operation. In the service operation, it includes the dynamic CN PDB indication. In block 802, the I-SMF sends N4 request to I-UPF to install the PCC rule. The N4 request includes the dynamic CN PDB indication.

Figure 9:
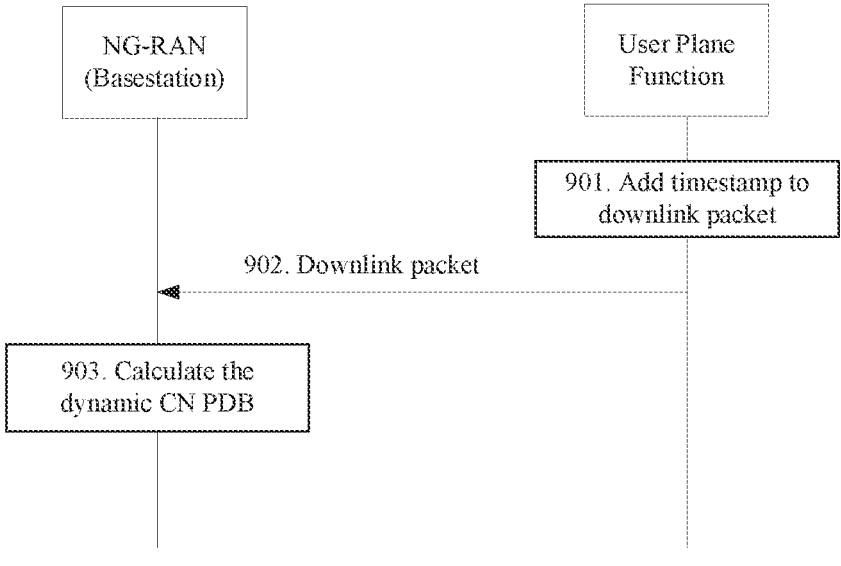
FIG. 9 shows an embodiment with NG-RAN calculating the CN PDB with time synchronization.

FIG. 9 shows an embodiment with NG-RAN calculating the dynamic CN PDB with time synchronization. FIG. 9 shows NG-RAN calculates the dynamic CN PDB when the NG-RAN and UPF are time synchronized. Time synchronization may include accessing the time from the same source. For example, two GPS devices (e.g. UPF and NG-RAN) receives the time from a satellite. In FIG. 9, the NG-RAN and UPF are time synchronized. In block 901, the UPF adds a timestamp to the downlink packet. The timestamp may be the time that the UPF sends the downlink packet. The timestamp can be added to the GTP-U header. The UPF can be either the PSA UPF or I-UPF as shown in FIG. 4. In block 902, the UPF sends the downlink packet to the NG-RAN in the User Plane ("UP"). In block 903, the NG-RAN calculates the dynamic CN PDB based on the timestamp in the downlink packet as compared with the time at the reception of the downlink packet. In other words, upon receipt of the downlink packet, the NG-RAN determines the time (e.g. a second timestamp T2) and subtracts that from the first timestamp T1. The delay between UPF and NG-RAN for this packet=T2−T1.

Figure 10:
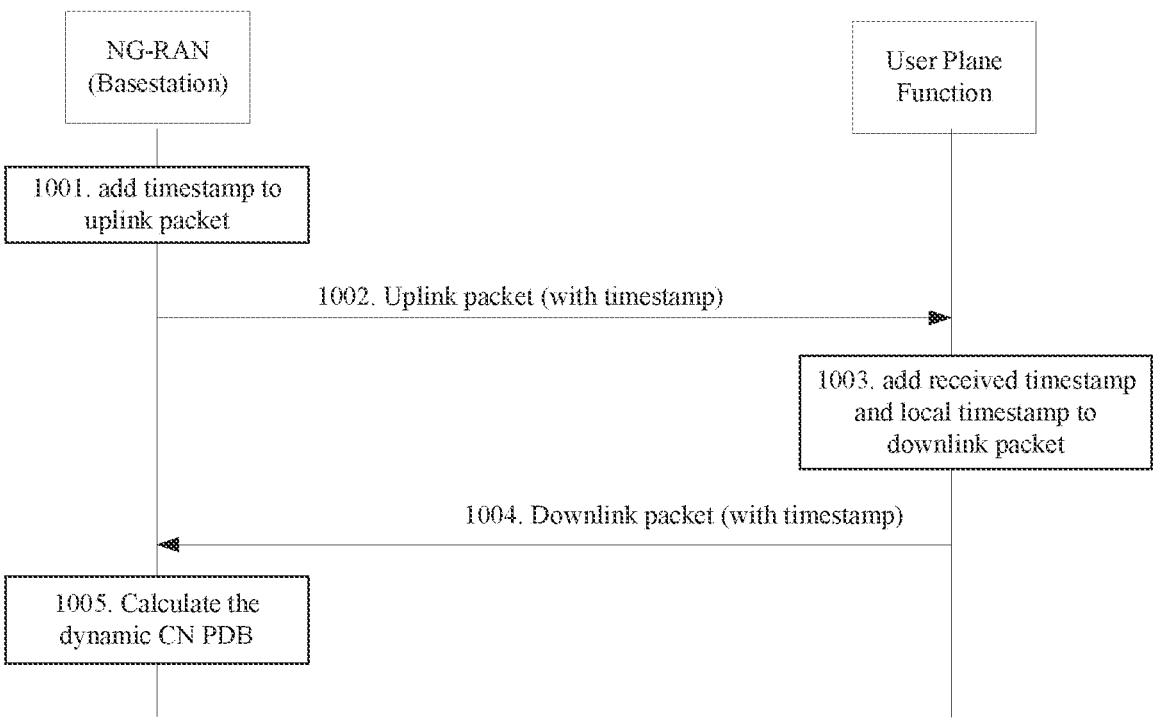
FIG. 10 shows an embodiment with NG-RAN calculating the CN PDB without time synchronization.

FIG. 10 shows an embodiment with NG-RAN calculating the CN PDB without time synchronization. In other words, the NG-RAN and UPF have their own times and there is no common time source for synchronization. Without time synchronization, there are additional timestamps that are used for calculating the delay. In block 1001, the NG-RAN adds a timestamp (e.g. the local time T1 when NG-RAN sends the uplink packet) to the uplink packet. The timestamp can be added to the GTP-U header. In block 1002, the NG-RAN sends the uplink packet to UPF in the User Plane. In block 1003, the UPF adds additional timestamps for both receipt of the uplink packet and a timestamp for sending of the downlink packet (1004). The local timestamp T2 is a time at the reception of the uplink packets and local timestamp T3 is a time when UPF sends out the downlink packet 1004 to the NG-RAN. The timestamps can be added to the GTP-U header. The UPF can be PSA UPF or I-UPF. The UPF sends the downlink packet to NG-RAN in U-plane in block 1004. The downlink packet includes the T1 timestamp (from NG-RAN 1001) and includes timestamp T2 and timestamp T3 from the UPF 1003. In block 1005, the NG-RAN calculates the dynamic CN PDB based on the timestamps in the downlink packet as well as another timestamp at the reception of the DL packet in 1005. For example, the timestamp in the uplink packet contains T1 (NG-RAN local time when NG-RAN sends the uplink packet), T2 (UPF local time at the reception of the uplink packet), and T3 (UPF local time when UPF sends out the downlink packet to NG-RAN). The NG-RAN records the local time T4 (which may also be referred to as a timestamp, although it is a measured local time) when receiving the downlink packet. The delay between UPF and NG-RAN can be calculated as (T2−T1+T4−T3)/2. Although described as four timestamps, the times used for this calculation may be part of a single timestamp. In other words, one timestamp may include T2 and T3. Accordingly, the dynamic calculation of CN PDB may rely on fewer timestamps.

Figure 11:
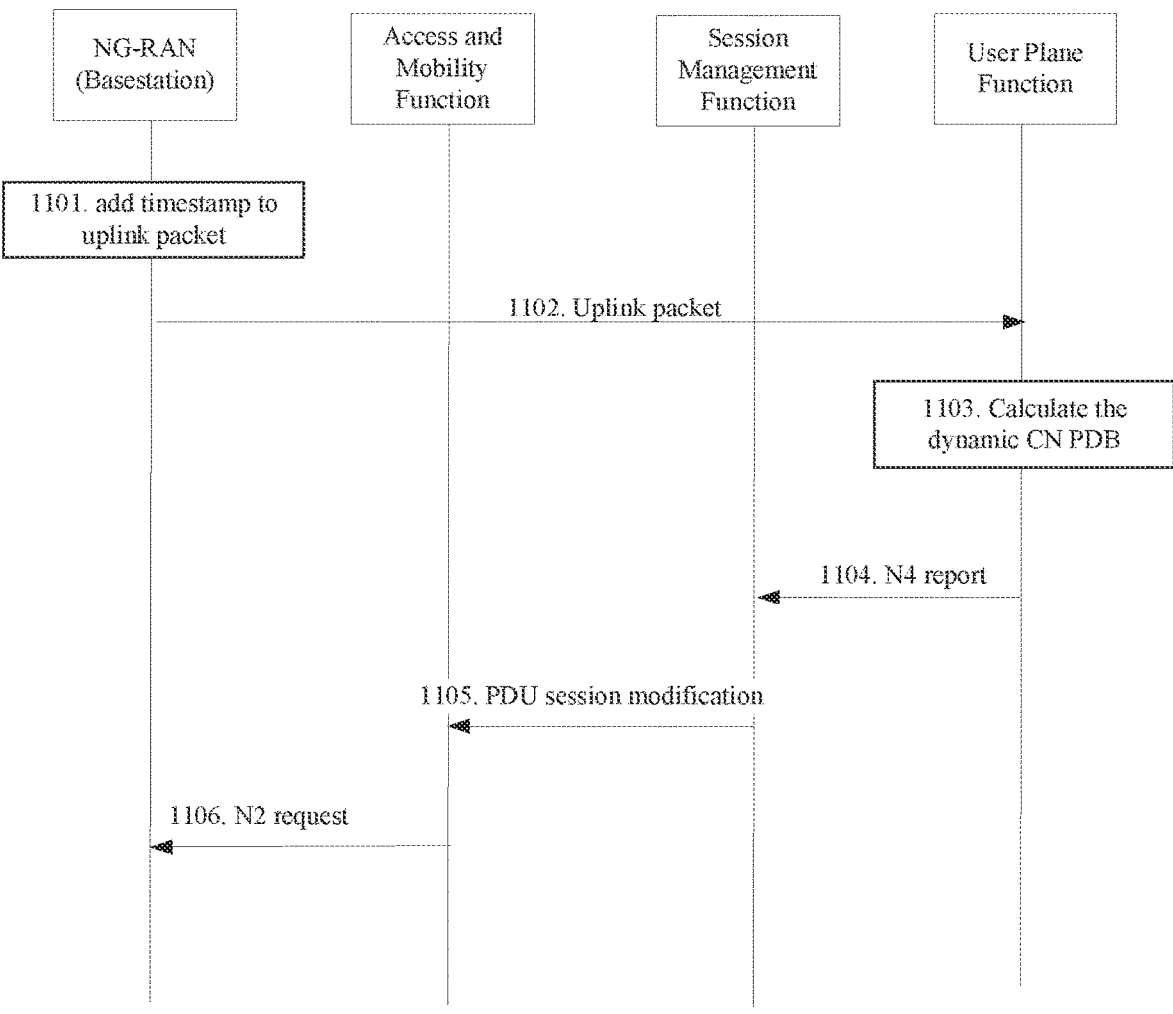
FIG. 11 shows an embodiment with UPF calculating the CN PDB with time synchronization and reporting to SMF.
Figure 12:
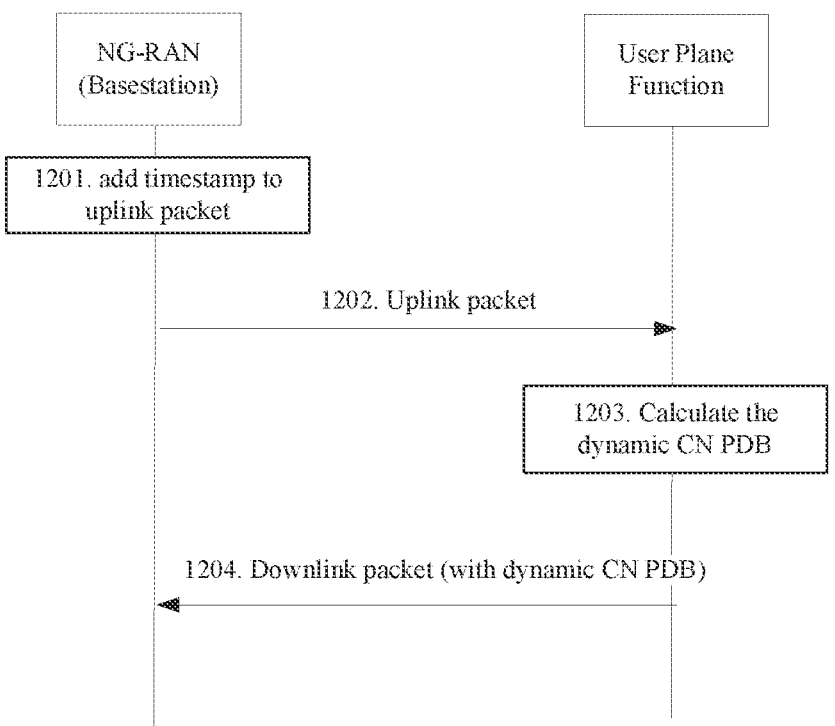
FIG. 12 shows an embodiment with UPF calculating the CN PDB with time synchronization and reporting to NG-RAN.
Figure 13:
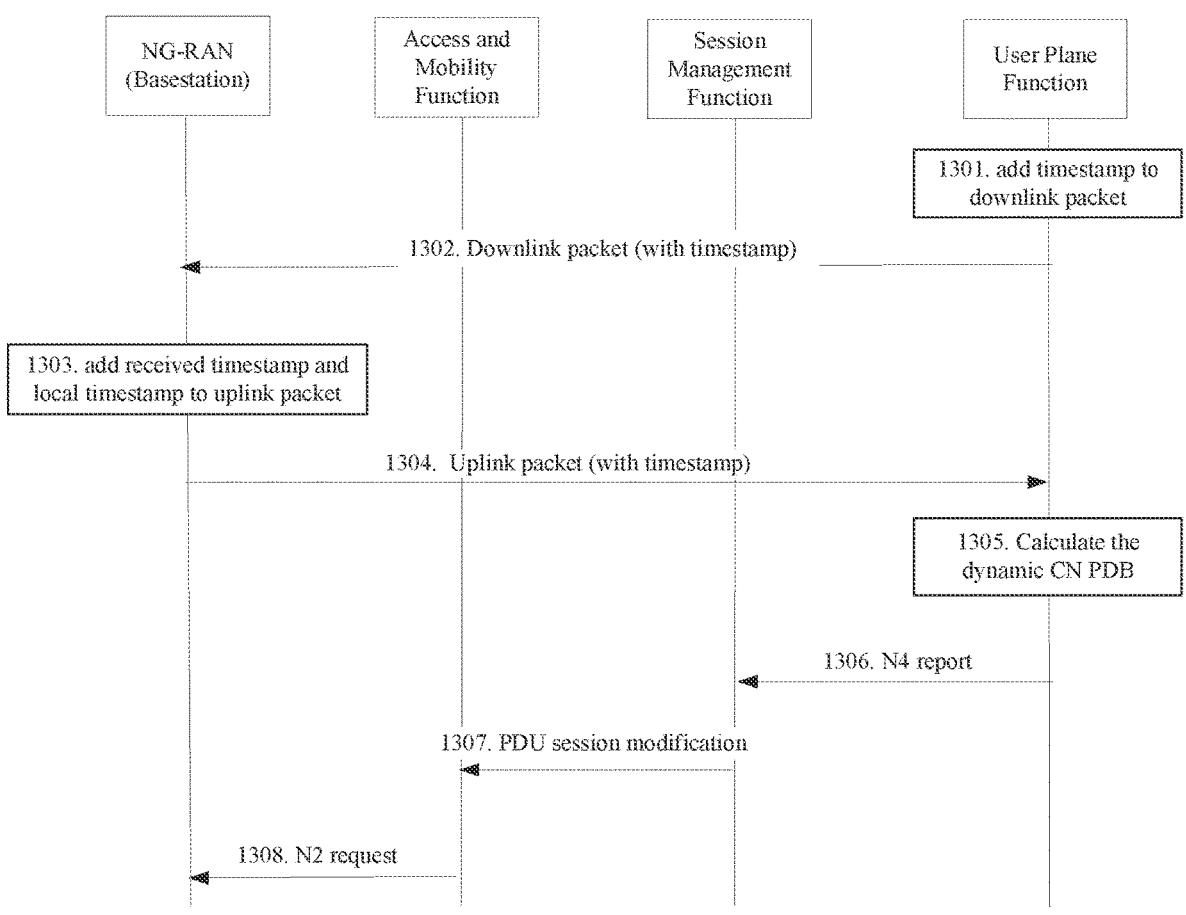
FIG. 13 shows an embodiment with UPF calculating the CN PDB without time synchronization and reporting to SMF.
Figure 14:
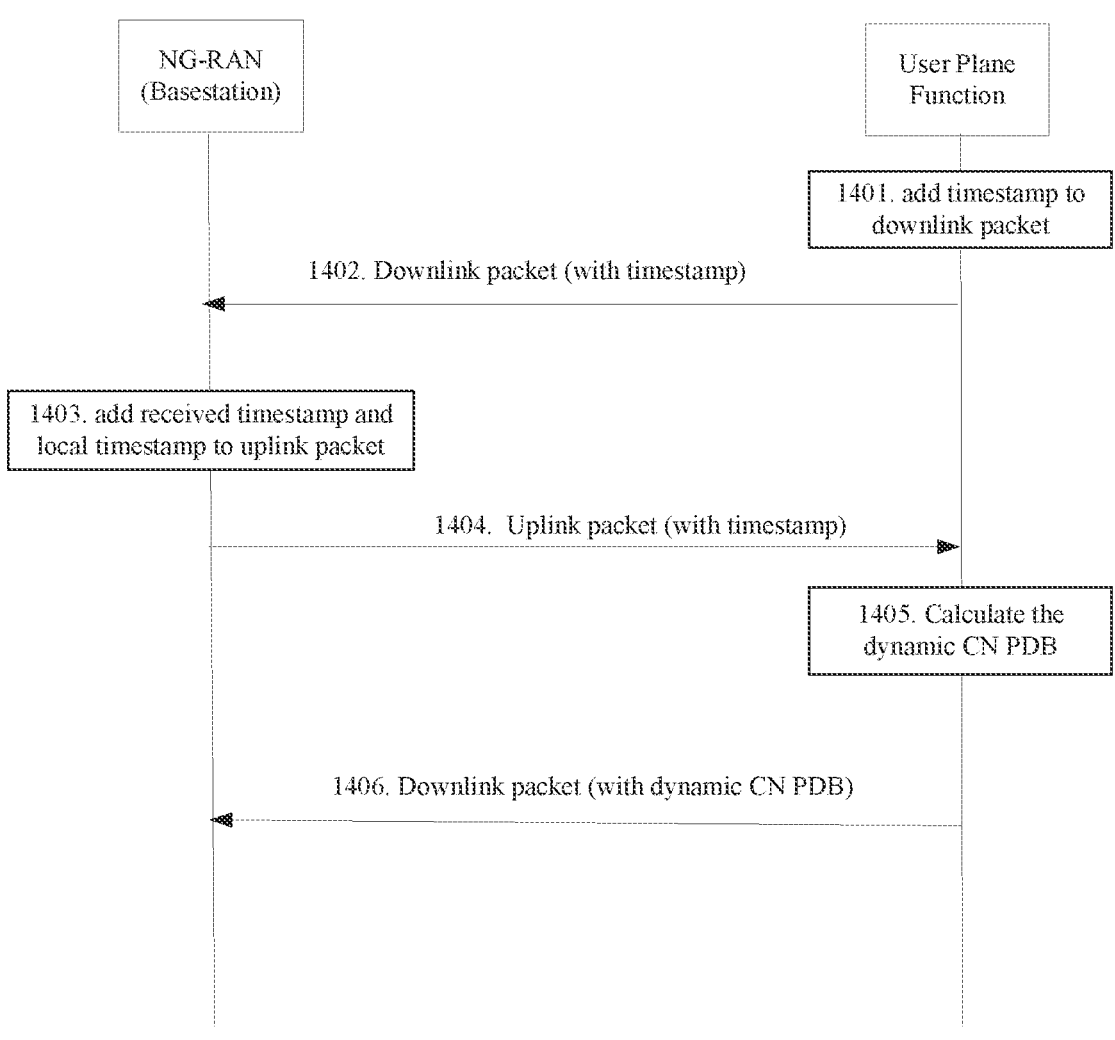
FIG. 14 shows an embodiment with UPF calculating the CN PDB without time synchronization and reporting to NG-RAN.

FIGS. 9-10 illustrated the NG-RAN calculating the dynamic CN PDB. FIGS. 11-14 illustrate the UPF calculating the dynamic CN PDB. FIGS. 11-12 are with time synchronization, while FIGS. 13-14 are with no time synchronization. FIGS. 11 and 13 includes the UPF reporting the dynamic CN PDB to SMF, while FIGS. 12 and 14 includes the UPF sending the dynamic CN PDB directly to NG-RAN.

FIG. 11 shows an embodiment with UPF calculating the CN PDB with time synchronization and reporting to SMF. As discussed above, time synchronization means that the NG-RAN and UPF have their time synchronized, such as accessing time from the same source. The UPF can be PSA UPF or I-UPF. In block 1101, the NG-RAN adds timestamp to an uplink packet. The timestamp is the time that the NG-RAN sends the uplink packet. The timestamp can be added to the GTP-U header. In block 1102, the NG-RAN send the uplink packet to UPF in U-plane. In block 1103, the UPF calculates the dynamic CN PDB according to the timestamp in the uplink packet and time at the reception of the uplink packet. The time at the reception of the uplink packet may be referred to as another timestamp T2 and the timestamp in the uplink packet is timestamp T1. In this example, the delay between UPF and NG-RAN for this packet=T2−T1. While T2 is referred to as a timestamp, it is a measured local time by the UPF that is then compared with time T1. In other words, timestamp T2 is not actually communicated (as in other timestamps) but is compared with a different time. Timestamp T1 is communicated as part of a packet (uplink packet 1102).

After calculation of the dynamic CN PDB, that information is transmitted to NG-RAN. FIG. 11 shows one example of this communication with the SMF and AMF. In block 1104, the UPF reports the dynamic CN PDB to SMF. If the UPF is I-UPF, the I-UPF reports the dynamic CN PDB to the I-SMF, and the I-SMF reports the dynamic CN PDB to SMF as shown in FIG. 4. In block 1105, the SMF initiates the PDU session modification towards UE via AMF and NG-RAN. The SMF may invoke a message transfer (e.g. Namf_Communication_N1N2 Message) to AMF which includes the dynamic CN PDB in the N2 SM information. In block 1106, the AMF sends NG-RAN, the N2 message which includes the N2 SM information with the calculated dynamic CN PDB.

FIG. 12 shows an embodiment with UPF calculating the CN PDB with time synchronization and reporting to NG-RAN. The calculation of the dynamic CN PDB is comparable to that calculation in FIG. 11. In block 1201, the NG-RAN adds timestamp to an uplink packet. The timestamp is the time that the NG-RAN sends the uplink packet. The timestamp can be added to the GTP-U header. In block 1202, the NG-RAN send the uplink packet to UPF in U-plane. In block 1203, the UPF calculates the dynamic CN PDB according to the timestamp in the uplink packet and time at the reception of the uplink packet. The time at the reception of the uplink packet may be referred to as another timestamp T2 and the timestamp in the uplink packet is timestamp T1. In this example, the delay between UPF and NG-RAN for this packet=T2−T1. While T2 is referred to as a timestamp, it is a measured local time by the UPF that is then compared with time T1. In other words, timestamp T2 is not actually communicated (as in other timestamps) but is compared with a different time. Timestamp T1 is communicated as part of a packet (uplink packet 1202).

After calculation of the dynamic CN PDB, that information is transmitted to NG-RAN. FIG. 12 shows another example of this communication that is different from FIG. 11. FIG. 12 illustrates the UPF sending the calculated dynamic CN PDB directly to the NG-RAN in the user plane in block 1204. Specifically, the UPF sends the downlink packet to NG-RAN, which includes the dynamic CN PDB. The dynamic CN PDB can be added to the GTP-U header.

FIG. 13 shows an embodiment with UPF calculating the CN PDB without time synchronization and reporting to SMF. In FIGS. 11-12, the UPF and NG-RAN were time synchronized, but in FIGS. 13-14 the UPF and NG-RAN are not time synchronized. FIG. 13 shows how the UPF calculates the dynamic CN PDB when the NG-RAN and UPF are not time synchronized. The UPF can be PSA UPF or I-UPF. In block 1301, the UPF adds a timestamp to a downlink packet. The timestamp is the local time T1 when the UPF sends the downlink packet. The timestamp can be added to the GTP-U header. In block 1302, the UPF send the downlink packet to NG-RAN in the U-plane. In block 1303, the NG-RAN adds a local timestamp T2 upon receipt of the downlink packet. The local time T2 is the reception of the downlink packet. In addition, the NG-RAN adds another timestamp T3 upon sending the uplink packet 1304. The timestamp T3 is when the NG-RAN sends out the packet to the UPF 1304. Both timestamps can be added to the GTP-U header. In block 1304, the NG-RAN sends the uplink packet to the UPF in the U-plane. In block 1305, the UPF calculates the dynamic CN PDB based on the timestamp T1, timestamp T2, and timestamp T3, which are compared with the local time at the UPF when the uplink packet is received. The receipt of the uplink packet 1304 at the UPF may be at timestamp T4. The time at the reception of the uplink packet T4 is compared with the three timestamps in the uplink packets. The delay is calculated as (T2−T1+T4−T3)/2 when the timestamp in the downlink packet contains timestamp T1 (UPF local time when NG-RAN send the DL packet), timestamp T2 (NG-RAN local time at the reception of the DL packets), timestamp T3 (NG-RAN local time when NG-RAN sends out the packet to the UPF), and the local time (timestamp T4) upon receipt of the uplink packet.

After calculation of the dynamic CN PDB, that information is transmitted to NG-RAN. FIG. 13 shows one example of this communication with the SMF and AMF. In block 1304, the UPF reports the dynamic CN PDB to SMF. If the UPF is I-UPF, the I-UPF reports the dynamic CN PDB to the I-SMF, and the I-SMF reports the dynamic CN PDB to SMF as shown in FIG. 4. In block 1305, the SMF initiates the PDU session modification towards UE via AMF and NG-RAN. The SMF may invoke a message transfer (e.g. Namf_Communication_N1N2 Message) to AMF which includes the dynamic CN PDB in the N2 SM information. In block 1306, the AMF sends NG-RAN, the N2 message which includes the N2 SM information with the calculated dynamic CN PDB.

FIG. 14 shows an embodiment with UPF calculating the CN PDB without time synchronization and reporting to NG-RAN. The calculation of the dynamic CN PDB is comparable to that calculation in FIG. 13. In block 1401, the UPF adds a timestamp to a downlink packet. The timestamp is the local time T1 when the UPF sends the downlink packet. The timestamp can be added to the GTP-U header. In block 1402, the UPF send the downlink packet to NG-RAN in the U-plane. In block 1403, the NG-RAN adds a local timestamp T2 upon receipt of the downlink packet. The local time T2 is the reception of the downlink packet. In addition, the NG-RAN adds another timestamp T3 upon sending the uplink packet 1404. The timestamp T3 is when the NG-RAN sends out the packet to the UPF 1404. Both timestamps can be added to the GTP-U header. In block 1404, the NG-RAN sends the uplink packet to the UPF in the U-plane. In block 1405, the UPF calculates the dynamic CN PDB based on the timestamp T1, timestamp T2, and timestamp T3, which are compared with the local time at the UPF when the uplink packet is received. The receipt of the uplink packet 1404 at the UPF may be at timestamp T4. The time at the reception of the uplink packet T4 is compared with the three timestamps in the uplink packets. The delay is calculated as (T2−T1+T4-T3)/2 when the timestamp in the downlink packet contains timestamp T1 (UPF local time when NG-RAN send the DL packet), timestamp T2 (NG-RAN local time at the reception of the DL packets), timestamp T3 (NG-RAN local time when NG-RAN sends out the packet to the UPF), and the local time (timestamp T4) upon receipt of the uplink packet.

After calculation of the dynamic CN PDB, that information is transmitted to NG-RAN. FIG. 14 shows another example of this communication that is different from FIG. 13. FIG. 14 illustrates the UPF sending the calculated dynamic CN PDB directly to the NG-RAN in the user plane in block 1404. Specifically, the UPF sends the downlink packet to NG-RAN, which includes the dynamic CN PDB. The dynamic CN PDB can be added to the GTP-U header.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method for wireless communication, comprising:
   receiving by a basestation from a User Plane Function ("UPF"), a downlink packet with a first timestamp, the first timestamp being a local timestamp at the UPF;
   calculating, dynamically by the basestation, a Core Network Packet Delay Budget ("CN PDB") based on the first timestamp; and
   communicating, by the basestation, the dynamically calculated CN PDB to the UPF.

2. The method of claim 1, further comprising:
   measuring, by the basestation, a local time as a second timestamp upon receiving of the downlink packet from the UPF; and
   subtracting, by the basestation, the second timestamp and the first timestamp to calculate the CN PDB;
   wherein the UPF and basestation are time synchronized.

3. The method of claim 1, further comprising:

checking, by the basestation, a second timestamp before receiving of the downlink packet;

adding, by the basestation before receiving the downlink packet with the first timestamp, the second timestamp to an uplink packet, wherein the downlink packet with the first timestamp is sent by the UPF after the uplink packet with the second timestamp is received at the UPF;

measuring, by the basestation, a time when the downlink packet with the first timestamp is received as a third timestamp; and calculating, by the basestation, the CN PDB based on the first timestamp, the second timestamp and the third timestamp, wherein the first timestamp includes both a time when the uplink packet is received and when a time the downlink packet is sent by the UPF, the second timestamp is a time when the uplink packet is sent, and the third timestamp is a local time upon the receiving of the downlink packet with the first timestamp;

wherein the basestation and the UPF are not time synchronized.

4. The method of claim 3, wherein the dynamic calculating of the CN PDB comprises ((the third timestamp minus the second timestamp) minus (a difference between the time when the downlink packet with the first timestamp is sent by the UPF)) divided by two.

5. The method of claim 1, further comprising:

deriving an Access Network Packet Delay Budget ("AN PDB") by using a total PDB and the dynamically calculated CN PDB, wherein the CN PDB is a delay between a User Plane Function ("UPF") and a basestation and the AN PDB is a delay between the basestation and a user equipment.

6. A method for wireless communication, comprising:

receiving, by a User Plane Function ("UPF") from a basestation, an uplink packet with a first timestamp, the first timestamp being a local timestamp at the basestation;

calculating, dynamically by the UPF, a Core Network Packet Delay Budget ("CN PDB") based on the first timestamp; and communicating, by the UPF, the dynamically calculated CN PDB to the basestation.

7. The method of claim 6, further comprising:

measuring, by the UPF, a local time at the UPF as a second timestamp upon receiving of the uplink packet from the basestation; and;

subtracting, by the UPF, the first timestamp from the second timestamp to calculate the CN PDB, wherein the UPF and the basestation are time synchronized.

8. The method of claim 6, further comprising:

checking, by the UPF, a second timestamp before receiving of the uplink packet;

adding, by the UPF before receiving the uplink packet with the first timestamp, the second timestamp to a downlink packet, wherein the uplink packet with the first timestamp is sent by the basestation after the downlink packet with the second timestamp is received at the basestation;

measuring, by the UPF, a local time as a third timestamp upon receiving of the uplink packet, wherein the uplink packet includes the first timestamp and the second timestamp, and wherein the first timestamp includes a time when the downlink packet is received and includes a time when the uplink packet is sent; and calculating the CN PDB based on the first timestamp, the second timestamp, and the third timestamp, wherein the basestation and the UPF are not time synchronized.

9. The method of claim 8, wherein the dynamic calculating of the CN PDB comprises ((the third timestamp minus the second timestamp) minus (a difference between the time when the downlink packet is received and the time when the uplink packet with the first timestamp is sent by the basestation)) divided by two.

10. The method of claim 6, wherein the communicating further comprises communicating, by the UPF, information of the dynamically calculated CN PDB to a Session Management Function ("SMF") and the SMF communicates the information to the basestation.

11. The method of claim 6, wherein the communicating of the dynamically calculated CN PDB is used for by the basestation for calculating an Access Network Packet Delay Budget ("AN PDB") that is used for determining scheduling of packets.

12. The method of claim 11, wherein the CN PDB is a delay between a User Plane Function ("UPF") and a basestation, wherein the AN PDB is a delay between the basestation and a user equipment.

13. A system for wireless communication comprising:

a User Plane Function ("UPF") determining a first timestamp according to a first local time at the UPF;

a basestation communicating with the UPF that dynamically calculates a Core Network Packet Delay Budget ("CN PDB") based on the first timestamp and a second local timestamp at the basestation; and a Session Management Function ("SMF") in communication with the UPF that provides an indication of the dynamically calculated CN PDB to the basestation or the UPF.

14. The system of claim 13, further comprising:

a user equipment in communication with the basestation, wherein an Access Network Packet Delay Budget ("AN PDB") is calculated for delay between the user equipment and the basestation.

* * * * *